(12) United States Patent
Sonnenmoser et al.

(10) Patent No.: US 10,214,383 B2
(45) Date of Patent: Feb. 26, 2019

(54) METHOD AND DEVICE FOR COMMISSIONING AN ELEVATOR SYSTEM

(71) Applicant: Inventio AG, Hergiswil (CH)

(72) Inventors: Astrid Sonnenmoser, Hochdorf (CH); Martin Hess, Baar (CH); Reto Tschuppert, Lucerne (CH); Ivo Lustenberger, Buttisholz (CH)

(73) Assignee: INVENTIO AG, Hergiswil (CH)

( * ) Notice: Subject to any disclaimer, the term of this patent is extended or adjusted under 35 U.S.C. 154(b) by 474 days.

(21) Appl. No.: 15/031,341

(22) PCT Filed: Sep. 19, 2014

(86) PCT No.: PCT/EP2014/070007
§ 371 (c)(1),
(2) Date: Apr. 22, 2016

(87) PCT Pub. No.: WO2015/058913
PCT Pub. Date: Apr. 30, 2015

(65) Prior Publication Data
US 2016/0280509 A1    Sep. 29, 2016

(30) Foreign Application Priority Data

Oct. 23, 2013  (EP) .................................. 13189801
Dec. 5, 2013   (EP) .................................. 13195851

(51) Int. Cl.
*B66B 1/34*      (2006.01)
*B66B 5/00*      (2006.01)
(Continued)

(52) U.S. Cl.
CPC ............ *B66B 5/0031* (2013.01); *B66B 13/22* (2013.01); *H04L 12/40013* (2013.01);
(Continued)

(58) Field of Classification Search
CPC .................. B66B 5/0031; B66B 13/22; H04L 12/40013; H04L 41/0893; H04L 41/22; H04L 49/102
(Continued)

(56) References Cited

U.S. PATENT DOCUMENTS 5,387,769 A  *  2/1995  Kupersmith ........ G06F 11/1625
                                                187/248
5,502,818 A  *  3/1996  Lamberg .................... B66B 1/34
                                                340/7.53
(Continued)

FOREIGN PATENT DOCUMENTS

CA        2844522 A1       2/2013
DE    102004062967 A1      7/2006
(Continued)

*Primary Examiner* — Anthony Salata
(74) *Attorney, Agent, or Firm* — William J. Clemens; Shumaker, Loop & Kendrick, LLP

(57) ABSTRACT

A method for commissioning an elevator system, the system having a control unit, a bus, and a plurality of bus nodes, which nodes are connected with the control unit through the bus, wherein the method includes the following steps: for each bus node, node-specific data are registered by the control unit; for each bus node, the registered node-specific data are compared with a participant list; and for each deviation between the participant list and the registered node-specific data, a message is issued for an operator.

14 Claims, 3 Drawing Sheets

(51) Int. Cl.
*B66B 13/22* (2006.01)
*H04L 12/40* (2006.01)
*H04L 12/24* (2006.01)
*H04L 12/933* (2013.01)

(52) U.S. Cl.
CPC .......... *H04L 41/0893* (2013.01); *H04L 41/22* (2013.01); *H04L 49/102* (2013.01)

(58) Field of Classification Search
USPC ........ 187/247, 248, 380–388, 391, 393, 396
See application file for complete search history.

(56) References Cited

U.S. PATENT DOCUMENTS

| | | | | |
|---|---|---|---|---|
| 5,561,277 A * | 10/1996 | Bockhold | ............... | B66B 1/285 187/247 |
| 5,654,531 A * | 8/1997 | Farabee | ................... | B66B 1/18 187/247 |
| 6,173,814 B1 * | 1/2001 | Herkel | ..................... | B66B 1/34 187/248 |
| 6,471,011 B1 * | 10/2002 | Ando | ....................... | B66B 1/34 187/247 |
| 7,172,055 B2 * | 2/2007 | Engel | .................... | B66B 5/0087 187/391 |
| 7,500,650 B2 * | 3/2009 | Deplazes | ................ | B66B 13/22 187/248 |
| 7,575,102 B2 * | 8/2009 | Matsuoka | ............ | B66B 5/0093 187/391 |
| 8,177,031 B2 * | 5/2012 | Flynn | ..................... | B66B 1/468 187/247 |
| 8,342,292 B2 * | 1/2013 | Demma | ................. | B66B 1/468 187/247 |
| 8,573,364 B2 * | 11/2013 | Fang | ........................ | B66B 1/34 187/391 |
| 8,807,284 B2 * | 8/2014 | Sonnenmoser | ......... | B66B 13/22 187/248 |
| 2007/0080026 A1 | 4/2007 | Tschuemperlin | | |

FOREIGN PATENT DOCUMENTS

| | | |
|---|---|---|
| WO | 0051929 A1 | 9/2000 |
| WO | 2010097404 A1 | 9/2010 |
| WO | 2010141026 A1 | 12/2010 |
| WO | 2013020806 A1 | 2/2013 |

* cited by examiner

TABLE - REGISTERED DATA

| Reference no. | ID  | Description                  | State  |
|---------------|-----|------------------------------|--------|
| (41)          | AAA | Hoistway door (61) story 1   | Closed |
| (411)         | BBB | Operating switch story 1     | Free   |
| (42)          | CCC | Hoistway door (62) story 2   | Closed |
| (421)         | DDD | Operating switch story 2     | Free   |
| (43)          | EEE | Hoistway door (63) story 3   | Closed |
| (431)         | FFF | Operating switch story 3     | Free   |
| (44)          | GGG | Elevator door (74) story 1   | Closed |
| (45)          | HHH | Operating unit (75) car 1    | Free   |
| (46)          | III | Emergency switch (76) car 1  | Free   |
| (47)          | JJJ | Brake (87) motor 1           | Open   |
| (48)          | KKK | Speed (88) motor 1           | Zero   |

Fig. 2

METHOD AND DEVICE FOR COMMISSIONING AN ELEVATOR SYSTEM

FIELD

The invention relates to a method and a device for commissioning an elevator system.

BACKGROUND

Elevator systems are provided with monitoring devices or safety circuits. These safety circuits typically consist of safety elements which are connected in series. These safety elements can, for example, monitor the state of hoistway doors or car doors. With respect to the latter, electromechanical safety circuits, or also bus-based safety circuits, are known. The safe operation of such safety circuits is regularly checked. Safety circuits, and testing methods for such circuits, are known, for example, from EP 1 159 218, WO 2010/097404, or WO 2013/020806. However, not apparent from this prior art is whether, or to what extent, a verification of the safety circuit takes place during the commissioning of elevator systems.

In the commissioning of known safety circuits, the possibilities of a bus-based safety circuit are not completely exhausted. Until now, the "classical" method is used, in that each sensor is individually tested for its correct functioning and installation. Therein, sensors are bridged, or manually actuated, so that testing in the actual operating state is not possible, and faults or incorrect installations are therefore possibly not detected. Further, such a commissioning is time-consuming and labor-intensive.

SUMMARY

It is therefore the task of the invention to propose a method and/or an apparatus which solves the problems of the known and with which, in particular an elevator system, can be quickly and reliably put into operation.

An elevator system has a control unit. The system is provided with a bus and a plurality of bus nodes which are connected with the control unit through the bus.

Assigned to each bus node is at least one sensor and/or actor, which monitors and/or controls components of the elevator system.

According to the invention, during commissioning of the elevator system, in a first step, the aforesaid control unit of the elevator system registers node-specific data for each bus node. Within the meaning of the present invention, node-specific data are understood to be data which are made available by the respective bus node of the control unit and which describe the bus node. These can be, for example, data that provide information about the type of a sensor, or actor, which is assigned to the bus node, for example whether the sensor monitors a state of a door (open/closed), detects the position of moving parts, registers a rotational speed of a motor, or an electrical dimension in an electric circuit, a weight, or an acceleration of moving parts. In the case of the actors, node-specific data are, for example, that the actor can lock or actuate a door.

Further node-specific data can also be an identification code of the bus node, of the sensors/actors that are assigned to the bus node, data that indicate a state of the corresponding sensor/actor (e.g. open or closed), and may also indicate when a change of state (e.g. from open to closed) has occurred. Thereby, after execution of the first step, the control unit obtains knowledge about the connected bus nodes of the elevator system and, in consequence, obtains an overall picture of the safety circuit of the elevator system.

In a second step, a verification is performed. This verification can include a comparison, in which the previously recorded node-specific data are, by means of the control unit, compared with data of a participant list. The participant list defines a system of expectations as to which bus nodes should display which characteristics. By this means it is determined whether the data that are recorded match the data that are present in the participant list. Alternatively or optionally, the verification can further contain a functionality test of the elevator system. Therein, the control unit checks whether the connected sensors, as a result of a provoked situation, transmit expected signals and function faultlessly. Furthermore, alternatively or optionally, the verification can comprise a plausibility test, in which it is checked whether the connected sensors, or sensor groups, fulfil the logical criteria that are prescribed by the elevator system. Should the verification lead to a positive result, a message can be sent to an operator to complete the commissioning and release the elevator system for normal operation.

In the above comparison, the expectations, and the actual state that is detected, form inputs for a verification. The verification itself can comprise various components. In a basic verification, the expectations are compared with the actual state. Therein, it is tested whether a corresponding number of each sensor type is present. In the case of a specific verification, for certain types of sensors, or groups, specific tests are performed. Through cross-comparisons, or additional items of information, the functionality of the sensors can be checked.

Finally, before the completion of the commissioning, or the release for normal operation, a functionality test can be performed, in which the functionality of each and every sensor is checked at least once. In particular, it can be checked for each sensor whether a change of state (for example, from closed to open) can be detected.

The verification can, for example in the case of sensors that are preconfigured ex works, be triggered when all preconfigured sensors are recognized. In this case, the expectations match the actual state. Alternatively, however, the verification can also be triggered through configuration data being received by the control unit, through a manual configuration having been completed, or through learnt sensors being actuated. The verification can hence be performed both completely manually as well as completely automatically.

Also, the participant list need not necessarily be saved in the control unit. It is sufficient for the participant list to be made available to the control unit, for example, by a server, to which the control unit is connected or by a further bus node of the elevator system.

If the data do not match, in a third step, for deviations between the registered node-specific data and the data of the participant list, a message is sent for an operator. This message can take place individually, for one deviation or one node, or for a plurality of deviations together.

The method according to the invention enables an exact diagnosis of which bus nodes display a deviation from the target state according to the participant list. Other than in known electromechanical safety circuits, with which a subdivision into a plurality of subsections is not possible, problems can be specifically detected. Furthermore, through the possibility of subsequently performed continuous self-tests, the safety and the availability of the elevator system can be increased.

Preferably, together with the message for an operator that node-specific data are not present in the participant list, goes an inquiry, as to whether the node-specific data that are not present should be added to the participant list.

Further preferably, or alternatively, together with the message for an operator that node-specific data are saved in the participant list, which, however, were not registered by the control unit, goes an inquiry as to whether these node-specific data should be removed from the participant list.

It can also be foreseen that, first, a renewed attempt is made to detect the node-specific data of the bus node in question, before the inquiry for an operator is issued.

Hence, an elevator system according to the invention can also be put into operation with a predefined participant list. In such a case, there should be no deviations between participant list and detected node-specific data, so that the commissioning, or at least a first phase of the commissioning, can be completed immediately.

Alternatively, the participant list can be empty, or contain only partly node-specific data, for example account-specific data, which are typically present in every elevator system, such as a bus node that interacts with a car door, or bus nodes that monitor a safety brake, etc.

It can also be foreseen that the bus nodes are successively connected or switched on. The control unit constantly monitors the elevator system and immediately detects whether new bus nodes have been connected or put into operation. Depending on whether or not the node-specific data are already present in the participant list, a corresponding message is issued for an operator.

It is also conceivable to configure an empty participant list manually on site, before the elevator system is put into operation. Also possible are automatic configurations via data memory or via remote maintenance. Common to the different variants is that a safety arrangement learns all connected sensors or participant and, in addition, preferably registers whether the sensor has changed its state. An up-to-date list of the connected, and hence active, sensors therefore exists at all times.

Also preferably, during the registration, it is also detected whether, in a bus node, a change of node-specific data, in particular of state-specific data, has occurred and whether therefore the bus node is, or was, active.

It can also be detected when this change in node-specific data took place. Therefrom, it can be deduced when the bus nodes were last active.

Further during the registration, a change of node-specific data, in particular of state-specific data, can be forced, for example in that a change of state is triggered in an assigned sensor. This serves also to determine whether the respective bus node is addressable.

After all of the bus nodes have been detected and saved in the participant list, a message for an operator can then be issued, to temporarily or definitively complete the commissioning and to release the elevator system for a normal operation, temporarily if required. Alternatively, this message for an operator can be issued when, in addition, the plausibility test, and/or the comparison of the participant list with the detected bus nodes, is complete.

Preferably, after completion of the temporary commissioning, a functionality test of the elevator takes place. Therein, specific bus nodes, or groups of bus nodes, can be singled out and bus-node-specifically, or group-specifically, tested. Through the control unit, an event of the elevator system is forced and it is detected whether the event results in a change of node-specific data which corresponds to the event.

For example, bus nodes that monitor the state of car doors and hoistway doors can be tested by a specific story being traveled to with the elevator car and it being tested whether the responsible bus nodes notify an opening and/or a closing of the respectively assigned doors of the control unit. For example, it can be checked whether the right nodes have been arranged in the right place. By means of cross-comparisons with other bus nodes that are related to the event, the functionality test can be augmented.

In the above example, by reference to the data from a bus node that detects the position of the elevator car, the functionality test can be augmented by it being ascertained that the story that is traveled to is, in fact, the correct story.

Bus nodes can be arranged at least partly redundantly, so that incorrect arrangements of bus nodes can be at least partly ruled out.

Further preferably, following the functionality test, or simultaneous therewith, a plausibility test takes place. In the plausibility test it is determined whether the detected node-specific data fulfil predefined logical criteria. Therein, in particular the arrangement of the bus nodes is checked. Impossible combinations of bus nodes, such as, for example "one hoistway door" and "a plurality of car doors", are not released for normal operation.

If the plausibility test should indicate that an impossible combination of bus nodes is existent, the commissioning can preferably be automatically restarted. Alternatively, the commissioning can also be manually restarted. Depending on the reason for the failed plausibility test, the commissioning can be started from the first step or, if necessary, also from the second step.

Preferably, information can be entered by an operator, to which reference is made for the plausibility test. For example, an existent number of stories in a building, which can be traveled to, can be entered. Thereby, in the plausibility test, combinations of bus nodes can be ruled out, which do not match the entered number of stories. In addition, the invention relates to a device for commissioning an elevator system. The device has a control unit, which is embodied for the purpose of executing the aforesaid steps.

DESCRIPTION OF THE DRAWINGS

The invention is described better below by reference to exemplary embodiments. Shown are in:

FIG. 2 schematically, a possible form of a participant list;

DETAILED DESCRIPTION

Figure 1:
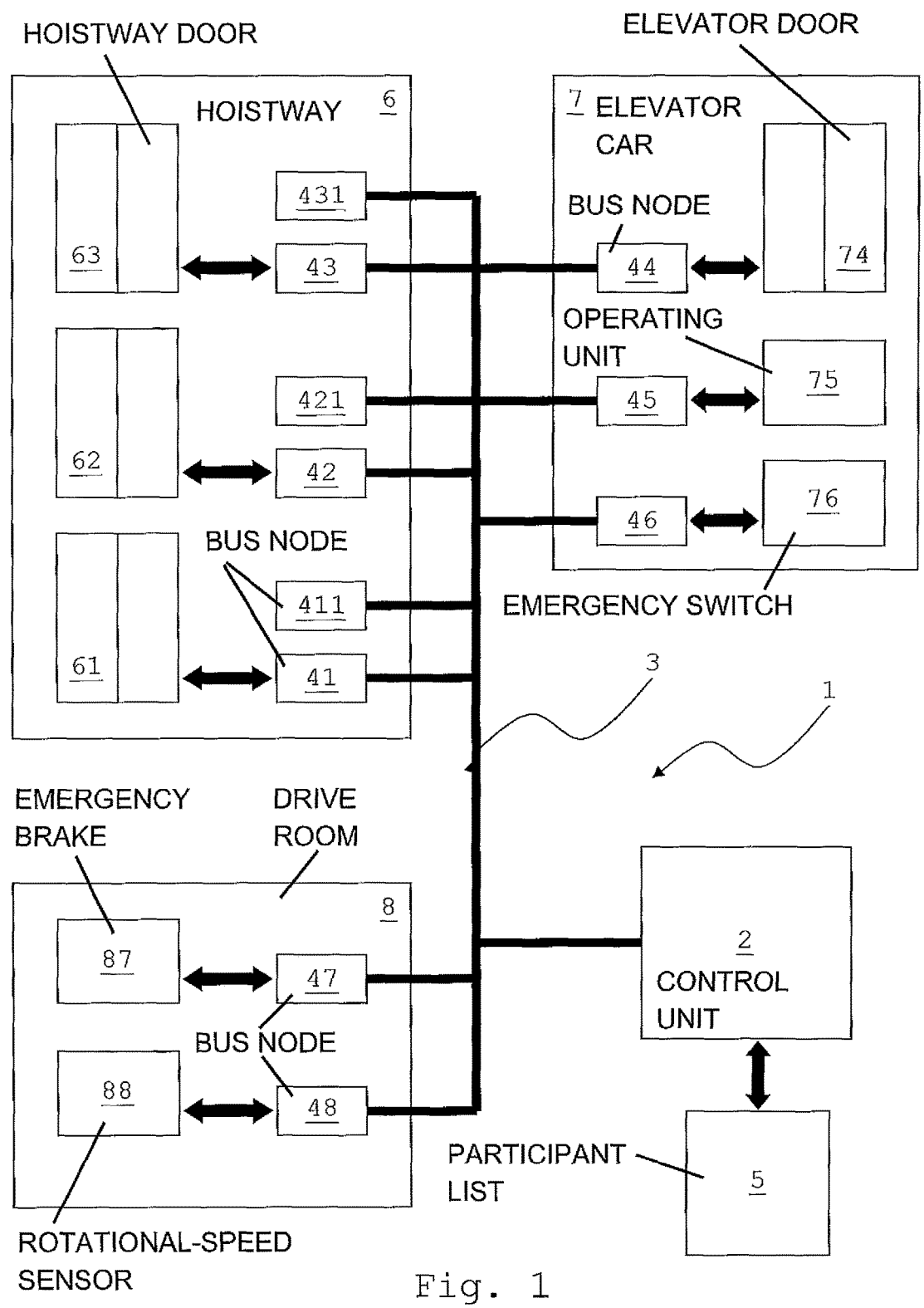
FIG. 1 schematically, a possible arrangement of an elevator system according to the invention.

The elevator system 1 that is shown schematically in FIG. 1 comprises a control unit 2, which, through a bus 3, is connected with a plurality of bus nodes 41 to 48.

Schematically represented with reference number 6 is a hoistway of a building into which the elevator system 1 is built. Exemplarily, the building has three stories, each story being equipped with a hoistway door 61, 62 and 63. Assigned to the bus node 41 is the hoistway door 61, to the bus node 42 the hoistway door 62, and to the bus node 43 the hoistway door 63.

Assigned to the respective bus nodes 41, 42 or 43 is a sensor, which registers information relating to the state of the assigned hoistway door 61, 62 or 63 (open, closed, locked) and, if necessary, can generate a fault message for the control unit 2. Further existent can be bus nodes 411, 421 and 431, which, in each case, are assigned to a switch for the purpose of calling the elevator.

The elevator system 1 further has an elevator car 7. The elevator car 7 is equipped with an elevator door 74, which is also assigned to a bus node 44. Assigned to the bus node 44 is a sensor, which detects information about the state of the assigned elevator door 74 (open, closed, locked) and can, if necessary, generate a fault message for the control unit 2.

The elevator system 1 can further have a bus node 45 and a bus node 46 which, in each case, are assigned to an operating unit 75, which is arranged in the elevator car 7, and to an emergency switch 76. The operating unit 75 serves the control of the elevator system 1 by a user, and enables the selection of a story which should be traveled to, and also contains switches for opening and/or closing the doors, an optical display, and/or a device for the output of speech messages, and an intercom system. In an emergency situation, through actuation of the emergency switch 76, the elevator system can be brought to an immediate standstill.

Further arranged in a drive room 8 is a drive unit, which is equipped with an emergency brake 87 and a rotational-speed sensor 88, which are assigned to a bus node 47 and 48 respectively. In a preferred embodiment, the drive unit is arranged in the hoistway, whereby a separate drive room is obviated.

In a commissioning of an elevator system 1, the control unit 2 detects the bus nodes 41 to 48, which are built into the elevator system and active, and the node-specific data of each bus node 41 to 48. The registered data are, for example, temporarily saved in a table, such as that shown in FIG. 2.

Then, by means of the control unit 2, the registered node-specific data are automatically compared with a participant list 5, which, in this exemplary embodiment, is empty. For this reason, in the absence of a match with the participant list 5, for each detected bus node 41 to 48, an inquiry is sent to a technician, who is responsible for the commissioning of the elevator system 1, as to whether or not the respective detected bus nodes 41 to 48 should be saved in the participant list.

Figure 3:
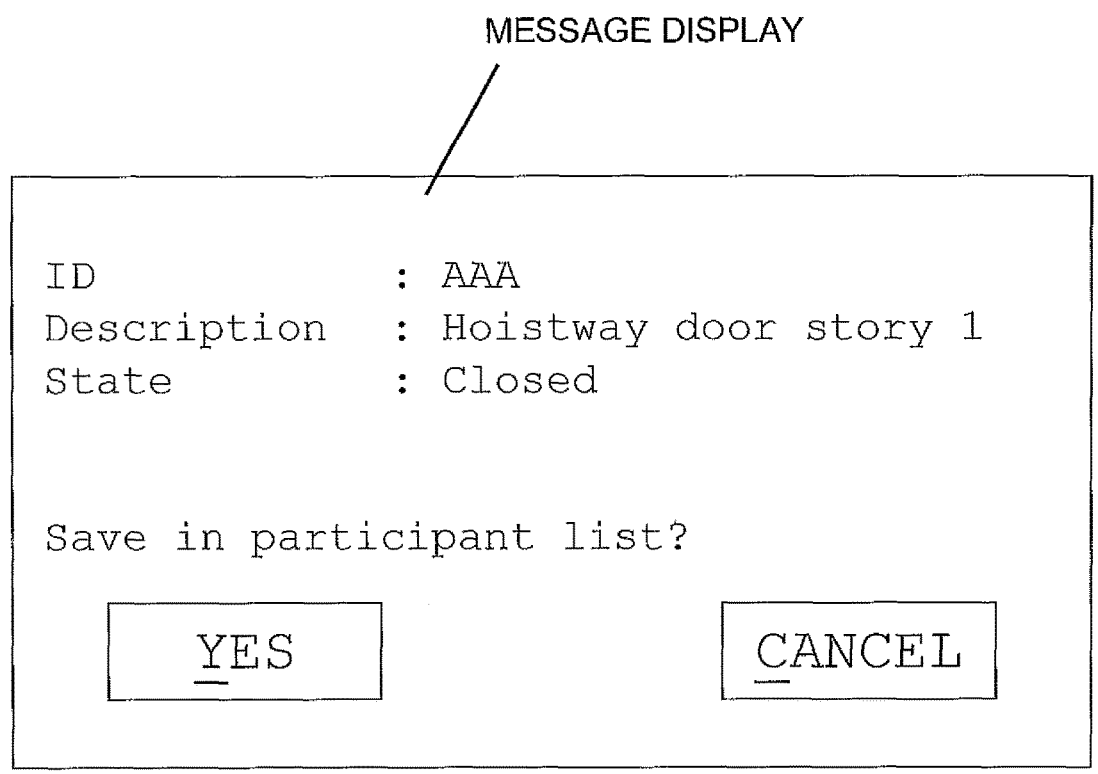
FIG. 3 schematically, a possible form of a message for an operator.

An exemplary message is shown schematically in FIG. 3.

In the event that the detected bus node 41 is confirmed, the technician receives a new message to save a further detected bus node, in this case, the bus node 411.

In the event of an abnormal termination, the technician is directed to a superordinated menu level, where he can, for example, restart the commissioning or edit the participant list.

Subsequently, the bus node 41 that is saved in the participant list 5 in this manner can then be subjected to a first functionality test. The control unit 2 controls the hoistway door 61 and leaves the latter open. The sensor that is assigned to the bus node 41 detects the opening of the hoistway door 61 and notifies this change of state to the control unit 2. Through the notified change of state, the functional capability of the bus node 41 is tested.

After all detected bus nodes in the participant list 5 have been saved, a message is issued that the first phase of the commissioning is complete. A request is then issued to complete the first phase of the commissioning.

Following the successful completion of the first phase of the commissioning, an expanded functionality test of the entire elevator system 1 takes place. At this point it should be noted that the aforementioned first functionality test can also be obviated if the expanded functionality test is performed.

The control unit 2 can, for example, simulate an actuation of the switch of the bus node 421 in the second story, so that the second story can be traveled to with the elevator car 7. During the travel to the second story, the control unit 2 receives from the bus node 48 node-specific data from the rotational-speed sensor 88 about the rotational speed of the motor, which indicate a movement of the elevator car 7.

When the elevator car 7 has reached the desired story, the elevator door 74 opens simultaneously with the hoistway door 62. The respective bus nodes 44 and/or 42 notify the change of state to the control unit 2, which confirms the functional capability of the two bus nodes 42 and 44. The procedure is correspondingly similar for the other stories, in that the bus node 45 is tested by the request to travel to a particular story being issued also by the operating unit 75.

To test the emergency switch 76, through the bus node 46 an actuation of the switch is simulated and, through a corresponding notification of node-specific data of the bus nodes 47 and 48, it is determined whether the emergency brake 87 immediately brings the elevator car 7 to a standstill.

It is apparent that such a functional test can also take place in classical manner, in that the technician is requested by the control unit 2 to perform certain steps. For example, by means of a mobile computer, which is wirelessly connected with the control unit 2, the technician can perform the functionality test alone.

Simultaneous with the expanded functionality test, or subsequent thereto, also a plausibility test of the elevator system takes place. The control unit checks whether the detected arrangement of bus nodes 41 to 48 is possible according to logical criteria which are predefined and/or depend on the detected node-specific data.

Following successful completion of the functionality and plausibility test, a message is issued for the release of the elevator system 1 for a normal operation.

An alternative possibility for commissioning is that, during the planning of the elevator system 1, a participant list 5 is already made ready. On the one hand, this serves as an instruction as to the position of the elevator system 1 at which the bus nodes 41 to 48 must be arranged. On the other hand, the participant list 5 is then referred to for the commissioning, whereby it is automatically determined by the control unit 2 whether the bus nodes 41 to 48 are present and, by means of functionality and plausibility testing, it is determined whether the bus nodes 41 to 48 have been correctly installed and are functionally capable.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for commissioning an elevator system, the system including a control unit, a bus, and a plurality of bus nodes, which, through the bus, are connected with the control unit, wherein the method comprises the following steps:
   registering by the control unit for each bus node node-specific data detected by the control unit;
   comparing the node-specific data that are registered for each of the bus nodes with data of a participant list using the control unit; and
   for deviations between the data of the participant list and the registered node-specific data, issuing from the control unit a message to an operator.

2. The method according to claim 1 including the steps of:
checking whether the node-specific data are saved in the participant list;
requesting a confirmation by an operator as to whether the node-specific data should be saved in the participant list; and
saving the node-specific data in the participant list in response to the confirmation by the operator.

3. The method according to claim 1 including the steps of:
checking whether, in the participant list, data are saved which were not registered by the control unit;
requesting a confirmation by an operator as to whether the data not registered by the control unit that are saved in the participant list should be deleted from the participant list; and
deleting the data not registered by the control unit in response to the confirmation by the operator.

4. The method according to claim 1 wherein when registering the node-specific data, information items regarding a state of a respective one of the bus nodes are registered.

5. The method according to claim 4 wherein when registering the node-specific data, a change in the state of the respective bus node is forced by the control unit.

6. The method according to claim 1 wherein the participant list is a predefined participant list.

7. The method according to claim 1 wherein the participant list is empty, or only partly contains node-specific data.

8. The method according to claim 1 wherein the control unit continuously checks whether new bus nodes have been connected to the bus.

9. The method according to claim 1 wherein when registering the node-specific data, it is determined whether, at a respective one of the bus nodes a change in the node-specific data has occurred.

10. The method according to claim 1 wherein it is determined whether the change in the node-specific data is a change in state-specific data.

11. The method according to claim 9 wherein it is determined when a change of the node-specific data occurred.

12. The method according to claim 1 wherein after completion of a temporary commissioning according to the method steps, at least one of a functional test of the elevator system and a plausibility test of the elevator system is performed.

13. A device for commissioning an elevator system comprising:
a bus;
a control unit connected to the bus; and
a plurality of bus nodes connected through the bus with the control unit, wherein the control unit registers node-specific data for each of the bus nodes, compares the registered node-specific data with data of a participant list for each of the bus nodes, and generates a message for an operator for deviations between the data of the participant list and the registered node-specific data.

14. An elevator system comprising:
an elevator car;
a bus;
a control unit connected to the bus;
a plurality of bus nodes connected through the bus with the control unit, each of the bus nodes receiving node-specific data from the elevator car having an elevator door, an operating unit and an emergency switch each connected to a respective one of the bus nodes, a plurality of hoistway doors each connected to a respective one of the bus nodes, an emergency brake connected to a respective one of the bus nodes, and a rotational-speed sensor connected to a respective one of the bus nodes, wherein the control unit registers the node-specific data for each of the bus nodes, compares the registered node-specific data with data of a participant list for each of the bus nodes, and generates a message for an operator for deviations between the data of the participant list and the registered node-specific data.

* * * * *